United States Patent
Daenen et al.

[11] 3,713,528
[45] Jan. 30, 1973

[54] EGG CUP

[75] Inventors: Robert Daenen, Erembodegem, Belgium; James B. Swett, Barrington, R.I.

[73] Assignee: Dart Industries, Inc., Los Angeles, Calif.

[22] Filed: May 1, 1970

[21] Appl. No.: 33,731

[52] U.S. Cl. ............. 206/1, 215/99.5, 211/14, 220/DIG. 27
[51] Int. Cl. ............. A47g 19/28, B65d 43/08
[58] Field of Search ............. 206/1 R; 211/14; D44/9; 215/99.5; 229/DIG. 14

[56] References Cited

UNITED STATES PATENTS

| | | | |
|---|---|---|---|
| D221,978 | 9/1971 | Daenen et al. | D44/9 |
| 1,898,654 | 2/1933 | Breslauer | 229/DIG. 14 |
| D199,461 | 10/1964 | Dailey | D44/9 |
| 2,606,708 | 8/1952 | Irvan | 220/42 A |

FOREIGN PATENTS OR APPLICATIONS

| | | | |
|---|---|---|---|
| 492,512 | 9/1938 | Great Britain | 211/14 |

*Primary Examiner*—Leonard Summer
*Attorney*—Leigh B. Taylor, Paul R. Wylie and Harold R. Beck

[57] ABSTRACT

An egg cup having a cap and base wherein the cap in an upright position engages with the base to prevent loss of heat from the egg and wherein the cap can be inverted and utilized to hold the egg while the egg is being broken.

4 Claims, 6 Drawing Figures

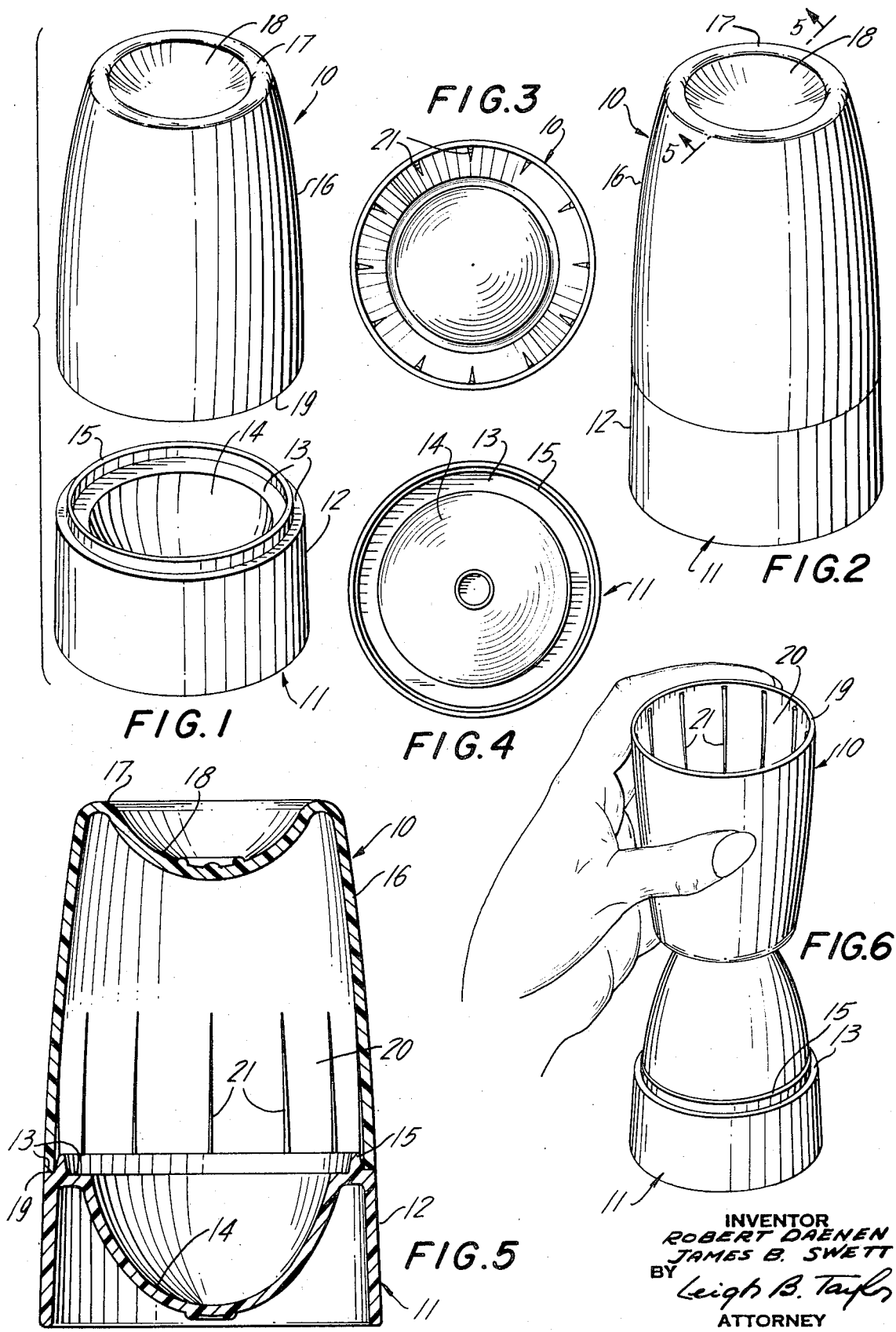

EGG CUP

This invention concerns an improved egg cup. Egg cups known in the prior art were inadequate for several reasons. After a hot egg was placed into a prior art egg cup, it was necessary to hold the egg with the fingers in order to crack the shell. It was uncomfortable to hold the hot egg and the fingers would occasionally become burned. If the egg were cooled for the purpose of holding the egg so that the shell could be easily cracked, the contents of the shell would also become cooled and therefore become unappetizing. It was not easy to keep an egg hot for a prolonged period of time using a prior art egg cup since heat simply radiated from the egg into the surrounding space.

The problems inherent in prior art egg cups have been eliminated by the improved egg cup herein disclosed. The inventive, new and improved egg cup comprises a cap and a base characterized in that the cap is depressed to hold the egg while the shell of the egg is being broken. The cap may also engage the base to prevent rapid loss of heat from the egg.

An object of this invention is to provide a new and improved egg cup which will prevent rapid cooling of the egg. Another object of this invention is to provide a new and improved egg cup which will provide means for holding the egg while the shell is being broken.

Other objects of this invention will become apparent throughout the following specification.

FIG. 1 is a top perspective exploded view showing a preferred embodiment of the inventive egg cup.

FIG. 2 is a top perspective view of a preferred embodiment of the egg cup showing the cap engaged with the base.

FIG. 3 is a bottom plan view of the cap.

FIG. 4 is a bottom plan view of the base.

FIG. 5 is a cross-sectional view taken on line 5—5 of FIG. 2.

FIG. 6 is a top perspective view of a preferred embodiment of the egg cup in accordance with this invention showing the use of the cap for holding the egg while the shell of the egg is being broken.

As shown in FIGS. 1, 2, 5, and 6 the invention comprises an egg container having a cap 10 and a base 11 wherein the cap 10 has a substantially ellipsoidal cavity 18 for holding the egg while the shell of the egg is being broken.

In accordance with a preferred embodiment of the invention as best seen in FIGS. 2 and 5 the cap 10 engages in an upright position with base 11. As best seen in FIG. 6 cap 10 can be inverted and used as a holder for the egg while the shell of the egg is being broken.

In accordance with the preferred embodiment of the invention, the egg container comprises a base 11 and cap 10 wherein the base 11 comprises first upstanding sidewalls 12 and an upper surface 13. The upper surface 13 is provided with a substantially ellipsoidal depression 14 for holding the egg while the egg is being eaten. Upper surface 13 is provided with an upstanding peripheral flange 15. The flange assists in engaging cap 10 when the cap 10 is placed in an upright position upon the base. The cap 10 has second upstanding sidewalls 16 and a top surface 17. The top surface is provided with a substantially ellipsoidal concavity 18. The ellipsoidal concavity 18 in cap 10 is used to assist in holding the egg, as shown in FIG. 6, while the egg is being broken. The second upstanding sidewalls 16 are provided with longitudinally extending ribs 21, said sidewalls terminating at their lower end in a bottom edge 19 which defines a space 20 having a dimension permitting said second upstanding sidewalls 16 to slip over said upstanding peripheral flange 15, so that said ribs engage said flange. The ellipsoidal depression 14 in base 11 holds the egg and cap 10 covers the top of the egg when cap 10 is engaged with base 11 as best seen in FIG. 5. In the preferred embodiment of the invention bottom edge 19 rests upon upper surface 13 when cap 11 is fully engaged with the upstanding peripheral flange 15.

The prior art problems are solved by the foregoing described structure for the inventive egg cup in that cap 10 and base 11 cooperate to prevent heat loss from the egg when cap 10 is engaged in an upright position with base 11 as shown in FIGS. 2 and 5. Ribs 21 tightly engage upstanding flange 15, while permitting slight ingress and egress of air and vapor from the space enclosed by said cap and said base. Air and vapor are permitted to pass between the ribs so that a vacuum will not form due to cooling which would make the cap difficult to remove and so that the cap will not be blown off due to increased pressure formed because of heated air resulting from a hot egg being placed within the enclosed space. The ribs also result in the formation of a strong engagement between the cap and base. If the ribs were not provided, the inside diameter of the cap would have to be almost exactly equal to the outside diameter of the upstanding flange. The ribs permit a strong engagement while permitting a greater tolerance in the difference between the inside diameter of the cap and the outside diameter of the upstanding flange.

As best seen in FIG. 6 the foregoing inventive structure is also used to permit breaking the shell of the egg without requiring engagement of the fingers with the hot egg.

What is claimed is:

1. A container for an egg having a cap and a base, said cap and base being adapted to mutually engage and enclose said egg to protect said egg from rapid loss of heat, said base comprising first upstanding sidewalls and an upper surface, said surface being provided with a depression for holding said egg, said cap having second upstanding sidewalls and a top surface having a concavity, said second upstanding sidewalls terminating at their lower end in a bottom edge adapted to engage said base to enclose said egg, said top concavity being adapted to engage said egg when the cap is inverted.

2. The egg container claimed in claim 1 wherein said bottom edge rests upon said upper surface when said cap is fully engaged with said upstanding peripheral flange.

3. The container of claim 1 wherein said upper surface of said base is provided with an upstanding peripheral flange and said second upstanding sidewalls and said bottom edge define a space having a dimension permitting engagement of the inside of said second sidewalls with the outer surface of said upstanding peripheral flange.

4. The container of claim 3 wherein said inside of said second sidewall is provided with longitudinally extending ribs adapted to engage said peripheral flange in a manner permitting slight air and vapor flow between said ribs and said flange to prevent the formation of a vacuum or a pressure buildup.

* * * * *